US009063993B2

(12) United States Patent
Madhusudanan et al.

(10) Patent No.: US 9,063,993 B2
(45) Date of Patent: Jun. 23, 2015

(54) COEXISTENCE TOOLS FOR SYNCHRONIZING PROPERTIES BETWEEN ON-PREMISES CUSTOMER LOCATIONS AND REMOTE HOSTING SERVICES

(75) Inventors: Vineeth Madhusudanan, Redmond, WA (US); Anandhi Somasekaran, Redmond, WA (US); Ananda Sinha, Bellevue, WA (US); Erik Ashby, Duvall, WA (US); Murli Satagopan, Sammamish, WA (US); Edward Wu, Bellevue, WA (US); Thane David Peterson, Bothell, WA (US); Richard William Meadows, Bellevue, WA (US); Robert Charles Ward, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 12/024,088

(22) Filed: Jan. 31, 2008

(65) Prior Publication Data
US 2009/0198835 A1 Aug. 6, 2009

(51) Int. Cl.
G06F 15/16 (2006.01)
G06F 17/30 (2006.01)
(Continued)

(52) U.S. Cl.
CPC .......... *G06F 17/30575* (2013.01); *H04L 67/10* (2013.01); *H04L 65/60* (2013.01); *H04L 67/02* (2013.01); *G06Q 10/06* (2013.01)

(58) Field of Classification Search
CPC ......... H04L 67/10; H04L 67/02; H04L 65/60; G06F 17/30575; G06Q 10/06
USPC .................................................. 709/248, 217
See application file for complete search history.

(56) References Cited

U.S. PATENT DOCUMENTS 5,937,414 A * 8/1999 Souder et al. ................. 707/616
6,061,740 A 5/2000 Ferguson et al.
(Continued)

FOREIGN PATENT DOCUMENTS

CN 1653420 A 8/2005
NL WO2007031963 A2 3/2007

OTHER PUBLICATIONS

"Multiple Forest Considerations in Windows 2000 and Windows Server 2003", 2008, Microsoft Corporation, pp. 17.
(Continued)

*Primary Examiner* — Ranodhi Serrao
*Assistant Examiner* — James Fiorillo
(74) *Attorney, Agent, or Firm* — Ben Tabor; Kate Drakos; Micky Minhas

(57) ABSTRACT

Coexistence tools are described for synchronizing properties between on-premises customer locations and remote hosting services. These tools may provide methods that send the tools for installation onto on-premises infrastructure located at customer sites, execute the tools to manage the customer infrastructure remotely via a hosted service, and synchronize properties at the customer site with the hosted service. Other methods may include receiving the tools from the hosted service, communicating configuration parameters related to operating the tools, and executing the tools in response to the configuration parameters. The tools may also provide systems that include on-premises servers associated with the customer infrastructure, with the on-premises servers including on-premises coexistence components for maintaining the property at the customer site. These systems may also include administrative servers associated with the hosted service. The administrative servers may include hosted-side coexistence components for maintaining and synchronizing counterparts of the on-premises properties.

20 Claims, 6 Drawing Sheets

(51) Int. Cl.
*H04L 29/08* (2006.01)
*H04L 29/06* (2006.01)
*G06Q 10/06* (2012.01)

(56) References Cited

U.S. PATENT DOCUMENTS

| | | | |
|---|---|---|---|
| 6,920,502 B2 * | 7/2005 | Araujo et al. | 709/229 |
| 7,080,104 B2 | 7/2006 | Ring et al. | |
| 7,181,493 B2 | 2/2007 | English et al. | |
| 7,392,421 B1 * | 6/2008 | Bloomstein et al. | 714/4 |
| 2002/0010865 A1 * | 1/2002 | Fulton et al. | 713/201 |
| 2002/0194207 A1 * | 12/2002 | Bartlett et al. | 707/203 |
| 2003/0051063 A1 | 3/2003 | Skufca et al. | |
| 2003/0061346 A1 * | 3/2003 | Pekary et al. | 709/224 |
| 2003/0083947 A1 | 5/2003 | Hoffman et al. | |
| 2004/0015566 A1 * | 1/2004 | Anderson et al. | 709/219 |
| 2004/0139180 A1 | 7/2004 | White et al. | |
| 2004/0172278 A1 | 9/2004 | Bell | |
| 2005/0120093 A1 * | 6/2005 | Nakano et al. | 709/217 |
| 2005/0193180 A1 * | 9/2005 | Fujibayashi | 711/162 |
| 2005/0289539 A1 * | 12/2005 | Krishna S | 717/177 |
| 2006/0155773 A1 | 7/2006 | Drouet et al. | |
| 2006/0179218 A1 * | 8/2006 | Burkey | 711/114 |
| 2006/0242210 A1 * | 10/2006 | Ring et al. | 707/204 |
| 2007/0028139 A1 * | 2/2007 | Wahl et al. | 714/6 |
| 2007/0050301 A1 * | 3/2007 | Johnson | 705/59 |
| 2007/0050578 A1 * | 3/2007 | Fujibayashi | 711/162 |
| 2007/0180075 A1 | 8/2007 | Chasman et al. | |
| 2007/0204280 A1 | 8/2007 | Mukundan et al. | |
| 2007/0226658 A1 | 9/2007 | Virk | |
| 2008/0010424 A1 * | 1/2008 | Morita | 711/162 |
| 2008/0189693 A1 * | 8/2008 | Pathak | 717/168 |
| 2008/0288937 A1 * | 11/2008 | Waterkamp | 717/177 |

OTHER PUBLICATIONS

"Integrating BackOffice Server with Office 2000", 2008, Microsoft Corporation, pp. 34.
"Using Oracle with Microsoft Active Directory", Sep. 2004, Oracle Corporation, pp. 10.
"International Search Report", Filed Date Dec. 31, 2008, Application No. PCT/US2008/088644, pp. 1-11.
Chinese Official Action dated Apr. 19, 2012 in Chinese Application No. 200880126161.8.

* cited by examiner

COEXISTENCE TOOLS FOR SYNCHRONIZING PROPERTIES BETWEEN ON-PREMISES CUSTOMER LOCATIONS AND REMOTE HOSTING SERVICES

BACKGROUND

Corporate enterprises typically devote considerable resources to acquiring and maintaining their computing infrastructure. These resources may include financial expenditures and commitments to purchase or lease the infrastructure, and may also include ongoing labor costs to maintain the infrastructure after acquisition.

SUMMARY

Coexistence tools are described for synchronizing properties between on-premises customer locations and remote hosting services. These tools may provide methods that send the tools for installation onto on-premises infrastructure located at customer sites, execute the tools to manage the customer infrastructure remotely via a hosted service, and synchronize properties at the customer site with the hosted service. Other methods may include receiving the tools from the hosted service, communicating configuration parameters related to operating the tools, and executing the tools in response to the configuration parameters. The tools may also provide systems that include on-premises servers associated with the customer infrastructure, with the on-premises servers including on-premises coexistence components for maintaining the property at the customer site. These systems may also include administrative servers associated with the hosted service. The administrative servers may include hosted-side coexistence components for maintaining and synchronizing counterparts of the on-premises properties.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a combined block in flow diagram illustrating additional details relating to the hosted service components, as well as illustrating data and/or process flows there between.

DETAILED DESCRIPTION

Figure 1:
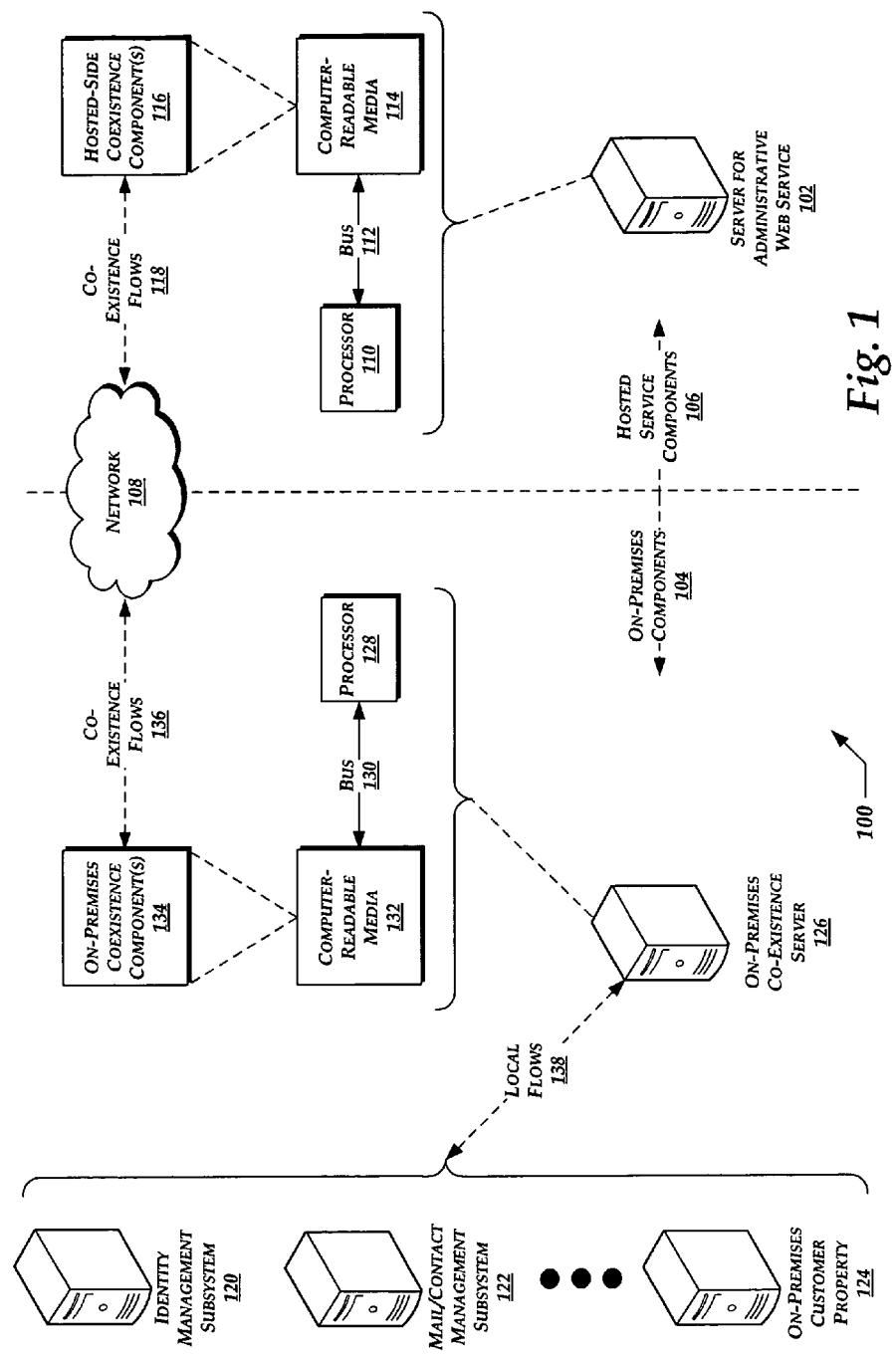
FIG. 1 is a combined block and flow diagram illustrating systems or operating environments for synchronizing properties between on-premises customer locations and remote hosting services.

The following detailed description is directed to technologies for synchronizing properties between on-premises customer locations and remote hosting services. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for synchronizing properties between on-premises customer locations and remote hosting services will be described.

FIG. 1 illustrates systems or operating environments, denoted generally at 100, for synchronizing properties between on-premises customer locations and remote hosting services. These systems 100 may include one or more server systems 102, with FIG. 1 illustrating an example server that operates an administrative Web service. The administrative Web service may enable a set of hosted service components, denoted generally at 106, to coexist with a plurality of components, denoted generally at 104, that are located at the premises of one or more customers.

The on-premises components 104 and the hosted service components 106 may communicate with one another over network infrastructure, denoted generally at 108. This network infrastructure 108 may represent one or more instances of networks, including for example local area networks, regional networks, or global communications networks (e.g., the Internet). The dashed line passing through the representation of the network 108 in FIG. 1 generally represents boundaries between the hosted service components 106 and the on-premises components 104.

Because the on-premises components 104 and hosted service components 106 communicate over the network 108, the components 104 and 106 may operate across dissimilar or disparate networks or operating environments. More specifically, the physical hardware hosting the components 104 at 106 may be remote from one another (i.e., physically and/or geographically separated, or separated by one or more network boundaries). These different operating environments may be dissimilar in that they may run different operating systems. For example, these environments may run different operating systems within the WINDOWS® family of operating systems available from Microsoft, may run instances of such operating systems combined with operating systems provided by other vendors, or may run instances of operating systems provided by such other vendors). In other examples, these different operating environments may employ different authentication mechanisms. Typically, the hosted components may have little in common with the on-premise components, except for a standard protocol. In contrast to previous coexistence tools that may involve two or more entities communicating over a trusted link, the coexistence tools described herein may communicate over one or more untrusted network links.

While FIG. 1 illustrates one administrative server system 102, implementations of the description herein may include any number of servers. The graphical elements used in FIG. 1 to depict the server systems, as well as other items illustrated elsewhere in the drawings, are chosen only to facilitate illustration, and not to limit possible implementations of the description herein.

Turning to the administrative servers 102 in more detail, these servers may include one or more processors 110, which may have a particular type or architecture, chosen as appropriate for particular implementations. The processors 110 may couple to one or more bus systems 112 chosen for compatibility with the processors 110.

The servers 102 may also include one or more instances of computer-readable storage media 114, which couple to the bus systems 112. The bus systems may enable the processors 110 to read code and/or data to/from the computer-readable storage media 114. The media 114 may represent storage elements implemented using any suitable technology, including but not limited to semiconductors, magnetic materials, optics, or the like. The media 114 may include memory components, whether classified as RAM, ROM, flash, or other types, and may also represent hard disk drives.

The storage media 114 may include one or more modules of instructions that, when loaded into the processor 110 and executed, cause the server 102 to perform various techniques for synchronizing properties between on-premises customer locations and remote hosting services. As detailed throughout this description, these servers 102 may provide the coexistence services using the components and data structures described herein.

Turning to the computer-readable media 114 in more detail, these may include one or more hosted-side coexistence components, denoted generally at 116. The coexistence components 116 may represent, for example, any number of software modules that, when executed, cause the server 102 to perform any of the functions allocated to it in connection with performing the administrative Web service.

The hosted-side coexistence software component 116 may be an instance of the hosted service components 106. More specifically, the hosted-side coexistence components 116 may communicate over the network 108 with one or more on-premises components 104 located at the premises of one or more customer sites. FIG. 1 denotes at 118 any data and/or process flows related to enabling coexistence between the hosted service components 106 and the on-premises components 104.

Turning to the on-premises components or properties 104 in more detail, these components may include one or more subsystems or servers 120 that function to manage identities, documents, accounts, and other properties that are associated respectively with a plurality of users. As indicated in the example shown in FIG. 1, the subsystems 120 may be implemented with one or more servers. Non-limiting examples of the identity management subsystem may include the ACTIVE DIRECTORY™ service available from Microsoft Corporation of Redmond, Wash., although implementations of the description herein may readily include examples of identity management provided by other vendors, including but not limited to Novell eDirectory™ (previously Novell NDS™), Lotus DOMINO™, or the like.

The on-premises components 104 may also include one or more subsystems or servers 122 for managing communications, e-mails, contact information, or the like, on behalf of one or more users. Non-limiting examples of the contact management subsystem 122 may include the EXCHANGE™ e-mail management services available from Microsoft, the NOTES™ services available from IBM, or products from other vendors.

FIG. 1 also illustrates an on-premises customer property 124, which generally represents applications, servers, services, accounts, or other properties. The other properties 124 generally indicate that the tools and techniques described herein for achieving coexistence between the hosted service components 106 and the on-premises components 104 may be extended beyond the identity management subsystem 120 and/or the contact management subsystem 122. For example, the property 124 may represent collaboration tools such as SHAREPOINT™ available from Microsoft, or similar collaboration tools available from other vendors.

The on-premises components 104 may also include one or more servers 126 that function as an interface or connector to the various subsystems 120, 122, and 124. In this sense, the server 126 may also serve as a gateway or synchronization agent to the subsystems 120, 122, and 124. It is noted that FIG. 1 illustrates the server 126 separately from the subsystems 120, 122, and 124 only for ease of reference and description, but not to limit possible implementations. More specifically, while the discussion herein may describe various functions as performed by the server 126, implementations of this description may allocate these functions to one or more other components.

Turning to the connector server 126 in more detail, it may include one or more processors 128, which may have a particular type or architecture, chosen as appropriate for particular implementations. The type or architecture of the processors 128 may or may not be the same as the type or architecture of the processors 110 described with the administrative server 102. The processors 128 may couple to one or more bus systems 130 that are chosen for compatibility with the processors 128.

The servers 126 may also include one or more instances of computer-readable storage media 132, which couple to the bus systems 130. The bus systems may enable the processors 128 to read code and/or data to/from the computer-readable storage media 132. The media 132 may represent storage elements implemented using any suitable technology, including but not limited to semiconductors, magnetic materials, optics, or the like. The media 132 may include memory components, whether classified as RAM, ROM, flash, or other types, and may also represent hard disk drives.

The storage media 132 may include one or more modules of instructions that, when loaded into the processor 128 and executed, cause the server 126 to perform various techniques for synchronizing properties between on-premises customer locations and remote hosting services. As detailed throughout this description, these servers 126 may provide the coexistence services using the components and data structures now described in connection with FIG. 1.

Turning to the computer room-readable media 132 in more detail, it may include one or more instances of on-premises coexistence components, denoted generally at 134. The coexistence components 134 may represent, for example, any number of software modules that, when executed, cause the server 126 to perform any of the functions allocated to it in connection with performing the administrative Web service. More specifically, the on-premises components 134 may communicate through the network 108 with the hosted-side components 116 to enable a level of coexistence between hosted service components 106 and on-premises components 104.

In example scenarios, the administrative Web service server 102 may operate hosted business services on behalf of one or more customers. In turn, these customers may operate the various subsystems (e.g., 120, 122, and/or 124) on their own premises, in addition to subscribing to the hosted business services. In such environments, the hosted business services may, for example, replicate at least some aspects of the customer's on-premises infrastructure. They hosted business services may also enable users associated with the customer to interact with the customer infrastructure, either directly through the on-premises components or through the hosted business services. In addition, the hosted business services may synchronize changes made by users to properties or accounts, whether made via the on-premises customer infrastructure, or through the hosted business services.

In these example scenarios, the customer's enterprise, as a whole, may be distributed across not only the on-premises infrastructure, but also to the hosted business services as well. Thus, the tools and techniques described herein may manage the customer's on-premises infrastructure (e.g., components or properties 104) together with those aspects of the customer's enterprise that are hosted remotely (e.g., by hosted service components 106). In this manner, these tools and techniques may avoid duplication of management effort that may otherwise arise from having aspects of the customer infrastructure deployed on-premises and posted remotely.

FIG. 1 denotes at 136 any data, process, and/or other flows related to achieving coexistence between the on-premises components 134 and the network 108. These flows 136 may represent such data, process and/or other flows related to achieving coexistence between a hosted business service in a given customer enterprise. For clarity of illustration only, FIG. 1 illustrates a single customer enterprise, but it is understood that the tools and techniques described herein may support any number of customer enterprises.

Within a given customer enterprise, local flows 138 may represent flows between the various on-premises subsystems within the enterprise (e.g., 120, 122, and/or 124). These local flows 138 may also represent local flows that are in some way related to the coexistence flows 136, whether the local flows cause a given instance of the coexistence flows 136, or result from a given instance of the coexistence flows 136.

The server 126, or more specifically the on-premises coexistence components 134, may be implemented in connection with a pre-existing synchronization engine (not shown in FIG. 1). Such synchronization engines may provide various user interfaces (UIs) that enable relatively sophisticated users or administrators to fine-tune or configure various parameters that govern operation of the synchronization engines. However, the coexistence components may programmatically configure the pre-existing synchronization engine, and thus shield the details of its operation from less-trained administrators.

Having described the operating environments or systems shown in FIG. 1, the discussion now proceeds to a description of relating to the on-premises and posted-side coexistence components. This description is now presented with FIG. 2.

Figure 2:
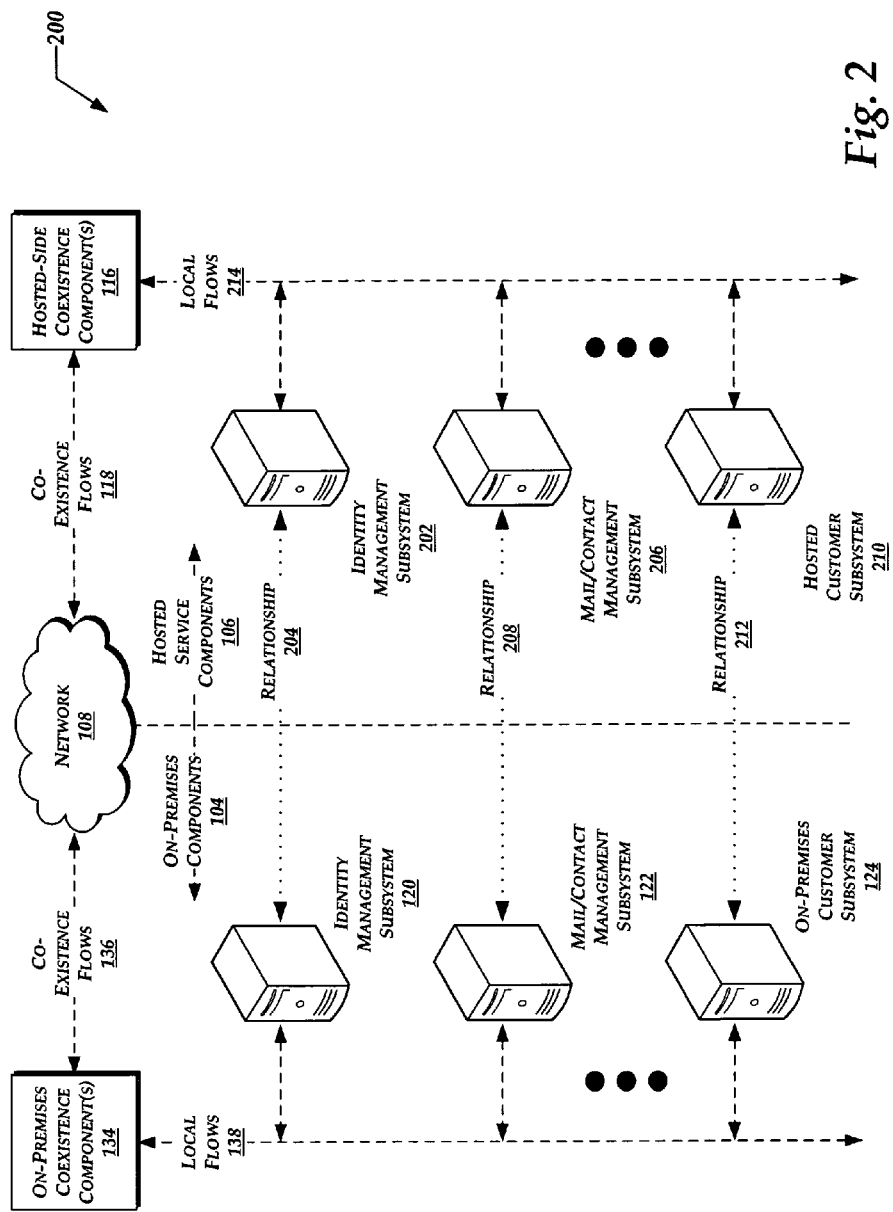
FIG. 2 is a combined block and flow diagram illustrating additional details of relationships between on-premises components and hosted service components.

FIG. 2 illustrates additional details, denoted generally at 200, of relationships between on-premises components and hosted service components. For ease of reference, and not limitation, FIG. 2 may carry forward some reference numbers from previous drawings to refer to similar items. For example, FIG. 2 carries forward the on-premises coexistence software components 134, the hosted-side coexistence software components 116, the coexistence flows 118 and 136 that may flow through the network 108, the local flows 138 that may occur within the customer premises, the general representation of the hosted-side components 106, the general representation of the non-premises components 104, and the example customer properties (e.g., subsystems 120, 122, and 124).

Turning to FIG. 2 in more detail, more specifically the hosted-side components 106, these components may, in some sense, replicate aspects of the infrastructure provided on-premises at a given customer facility. For example, assuming that the on-premises components 104 at the customer facility includes an identity management subsystem (e.g., 120), the hosted-side components 106 may include a corresponding identity management subsystem, denoted at 202. The identity management subsystem 202 may reside on its own server, or may share a physical box with one or more other hosted-side components 106. As described in further detail below, the coexistence software components 116 and 134 may replicate the least part of the data and/or properties stored between the two subsystems 120 and 202. FIG. 2 represents this replication by the dotted line 204, which generally represents that portion of the coexistence flows 118 and 136 attributable to maintaining coexistence between the subsystems 120 and 202.

Similarly, assuming that the on-premises components 104 include a mail/contact management subsystem 122, the hosted-side components 106 may include a corresponding mail/contact management subsystem 206. FIG. 2 denotes at a dotted line 208 the replication of information and/or properties between the subsystems 122 and 206.

Finally, assuming that the on-premises components 104 include a general customer subsystem 124, the hosted-side components 106 may include a corresponding subsystem 210. FIG. 2 denotes at a dotted line 212 the replication of information and/or properties between the subsystems 124 and 210.

The host-side software components 116 may facilitate local flows 214 with and among the various subsystems included within the hosted-side components 106. As shown, examples of such subsystems may include those shown at 202, 206, and 210.

As an operational example, assume that some aspect of the identity management subsystem 120 changes on the premises of the customer site. In turn, local flows 138 may present this change to the on-premises coexistence components 134. These components 134 may then generate coexistence flows 136 that provide notification of this change, and it may transmit these flows 136 over the network 108 to the hosted-side coexistence components 116. In turn, the coexistence components 116 may receive coexistence flows 118 that correspond to the flows 136 and include notifications of the change that occurred on a subsystem 120.

At the hosted-side, coexistence components 116 may extract from the flows 118 the notification of the change to the subsystem 120, and identify the hosted-side subsystem that corresponds to the subsystem 120 that changed on the customer premises. In this example, the hosted-side subsystem 202 corresponds to the changed on-premises subsystem 120, as indicated by the dotted line 204. Accordingly, the coexistence components 116 may generate local flows 214 to the subsystem 202. In turn, these flows may update the subsystem 202 with whatever change occurred on the on-premises subsystem 120, thereby enabling the on-premises subsystem 120 and the hosted-side subsystem 202 to coexist.

The foregoing example illustrates how the tools and techniques described herein may enable any number of on-premises subsystems or components (e.g., generally 104, with examples 120, 122, and/or 124) to coexist with corresponding instances of hosted-side subsystem or components (e.g., generally 106, with examples 202, 206, and/or 210). In FIG. 2, the dotted lines 204, 208, and 212 represent relationships between various on-premises components 104 and hosted-side components 106. However, communications or flows may or may not pass directly between these subsystems, but may instead flow through the coexistence components 134 and 116.

Having described in FIG. 2 the additional details of relationships between the on-premises components and the hosted service components, the discussion now turns to a more detailed description of the hosted service components, and the relationships there between. This description is now presented with FIG. 3.

Figure 3:
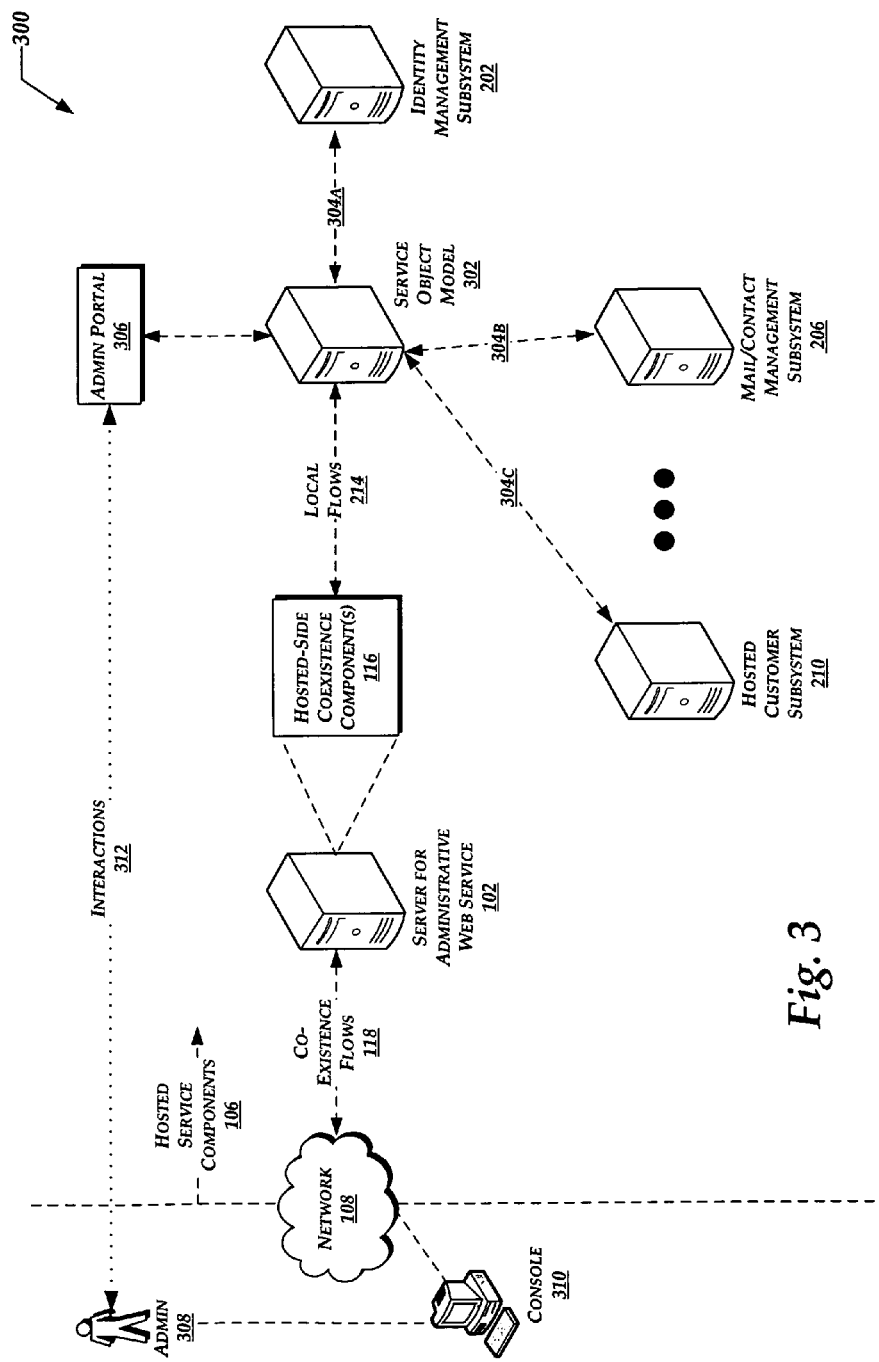

FIG. 3 illustrates additional details, denoted generally at 300, relating to the hosted service components, as well as illustrating data and/or process flows there between. For ease of reference, and not limitation, FIG. 3 may carry forward some reference numbers from previous drawings to refer to similar items. For example, FIG. 3 carries forward the network 108, the hosted service components 106, the coexistence flows 118, the server 102, the hosted-side coexistence software 116, and the examples of hosted subsystems 202, 206, and 210.

As described previously, the server 102 for the administrative Web service may include software components 116 that enable coexistence between various hosted service components 106 and corresponding components or subsystems located on-site at customer premises. In the example shown in FIG. 3, the hosted service components 106 may include the subsystems 202, 206, and/or 210. FIG. 3 also carries forward examples of local data/process flows 214, with specific instances of these local flows indicated as appropriate in FIG. 3. For example, flows 214 may link the coexistence software 116 with a server 302 that hosts a service object model (SOM).

Turning to the server 302 that hosts the SOM (hereafter, the SOM server), the SOM may represent a common object model utilized across the administrative Web service. For example, the SOM may incorporate common logic that is deployed across the various hosted service components 106. In the example shown, the server 302 hosting the SOM may communicate with the hosted identity management subsystem 202, as represented by the dashed line 304a. In addition, the server 302 may also communicate with the subsystems 206 and 210, as indicated by the respective dashed lines 304b and 304c. In FIG. 3, the local data flows 214 may represent communications between the coexistence software 116 and any one or more of the identity management subsystem 202, the hosted mail/contact management subsystem 206, and the hosted customer subsystem 210.

The SOM server 302 may also present a user interface (UI), by which administrative personnel associated with the customer site may interact with the administrative Web service. FIG. 3 illustrates an example of this UI as an admin portal 306, and illustrates an example of the administrative personnel at 308. The admin personnel 308 may access a console or desktop 310, which may present the admin portal 306. The admin personnel may interact with the admin portal as appropriate to, for example, configure the administrative Web service for the customer site for which the administrator is responsible, or other example functions as described herein. FIG. 3 generally represents these interactions at 312. These interactions may represent an initial configurations, as well as reconfigurations that may occur once operations are underway.

The administrative server 102 may expose a set of application program interfaces (APIs) to customer data centers, at least in part to facilitate the coexistence flows 118 and 136. The administrative server 102 may also expose a second set of APIs through the SOM server 302 through which the admin server may provision users and objects as part of the hosted services.

Having described the additional details relating to the hosted service components, and the data and/or process flows there between, the discussion now turns to a description of types of data that may be synchronized between the on-premises components and the hosted services components. This description is now presented with FIG. 4.

Figure 4:
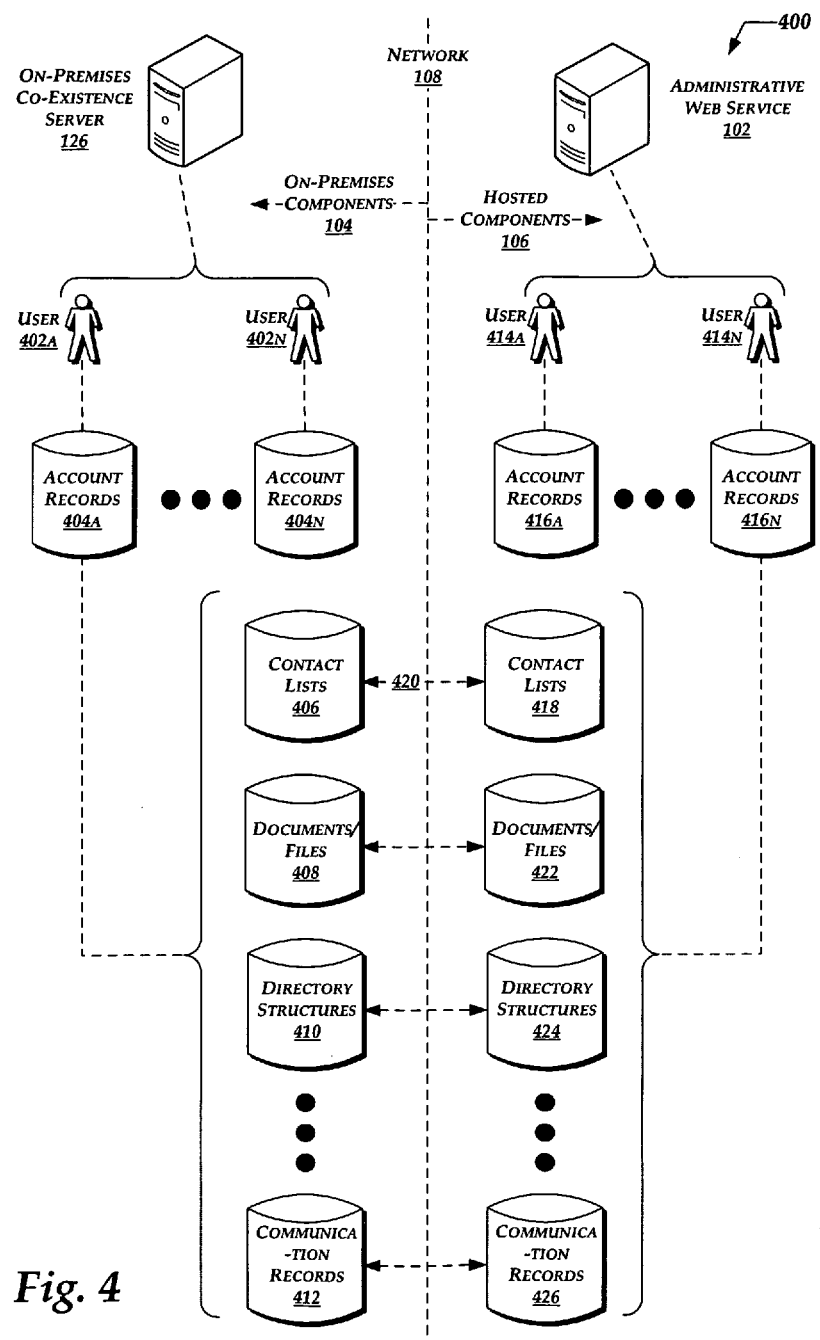
FIG. 4 is a block diagram illustrating synchronization scenarios in which various types of data is exchanged between an on-premises coexistence server and an administrative server.

FIG. 4 illustrates synchronization scenarios, denoted generally at 400, in which various types of data is exchanged between, for example, an on-premises coexistence server and a server associated with an administrative Web service. For ease of reference, and not limitation, FIG. 4 may carry forward some reference numbers from previous drawings to refer to similar items. For example, FIG. 4 carries forward the servers 126 and 102.

Turning first to the components 104 located on the premises of a given customer, FIG. 4 illustrates example users 402a and 402n (collectively, users 402) who may be accessing on-premises components 104 associated with a given customer enterprise. For example, these users may access one or more servers (e.g., 120, 122, and/or 124 shown in FIG. 1). While FIG. 4 illustrates to users 402a and 402n, implementations of this description may accommodate any number of users.

In turn, the on-premises components 104 may maintain respective account records associated with the users 402. The exact contents of the account records maintained for particular users may vary, depending upon the servers, applications, and/or services made accessible to particular users. Therefore, FIG. 4 presents various examples of information that the account records may maintain, with the understanding that implementations of this description may differ without departing from the scope and spirit of the description.

FIG. 4 provides examples of account records maintained on the customer premises, as denoted at 404a and 404n (collectively, account records 404). Respective instances of the account records 404 may be associated with prospective users 402, as indicated by the dashed lines connecting the account records 404 and users 402. While FIG. 4 illustrates two examples of the account records, it is noted that implementations of this description may accommodate any number of account records, which in turn may have any convenient relationship to respective users. For clarity of illustration, FIG. 4 elaborates on illustrative contents of the account record 404a, but it is understood that this description may apply to any of the account records 404.

Turning to the account record 404a in more detail, example account records may maintain contact list information, denoted generally at 406. Examples of contact list information 406 may include e-mail address lists maintained by particular users, global address lists (GALs), distribution lists, or the like.

The account records 404 may maintain documents or files associated with particular users, denoted generally at 408. The particular type or format of these documents or files may vary, depending on the applications or tools made available to the users 402.

The account records 404 may maintain directory structures and other identity information associated with particular users, denoted generally at 410. For example, the directory structures 410 may represent information maintained by services such as ACTIVE DIRECTORY™ or other similar services. Generally, the directory structures 410 may also include identification or authentication information associated with particular users. In addition, the coexistence tools described herein may provide a federation capability, in which user identities are mapped from on-premises customer systems to remote hosted environments.

The account records 404 may maintain communication records associated with particular users, denoted generally at 412. Examples of such communication records may include received e-mails, sent e-mails, archives of previous e-mails, or similar records of such transmissions.

Turning now to the hosted service components 106, FIG. 4 illustrates users 414a and 414n who may access hosted services, whether through the server 102, or through servers associated with the administrative Web service (e.g., 202, 206, and/or 210). In turn, the users 414a and 414n are associated with respective instances of account records 416a and 416n, as maintained by the administrative Web service.

In some scenarios, a given user (e.g., 402a) may access his or her account records (e.g., 404a) through on-premises components 104, but may at some other time access his or her account records through the hosted service components 106. In this example, the user 402a and the user 414n may correspond to the same given user accessing his or her account records at different times. Thus, the on-premises components 104 may maintain account records 404a that the given user may access through the server 126, and the hosted service components 106 may maintain corresponding account records 416n that the given user may access through the server 102.

Turning to the account records 416n in more detail, these records may include records corresponding to those maintained by the on-premises components 104. For example, these records may include contact lists 418 that correspond to the contact lists 406, as indicated by the dashed arrow 420 connecting these two items in FIG. 4. Taken collectively, the contact lists 406 maintained on-premises at a customer site and the contact lists 418 as maintained by the remote hosted service may be configured into a synchronized or integrated contact or address list, unified across both the customer site and the remote hosted services.

More generally, the dashed arrow 420 may represent data flows between a customer premises or data center and a remote hosted service. As an example of the foregoing operations, assume that a property or data object residing at the customer premises is to be migrated to the remote hosted service. During this migration, attributes associated with this property or data object may be "shadowed" from the customer data center to the remote hosted service. Once the remote hosted service receives these shadowed attributes, it may then replicate these shadowed attributes into actual attributes that are associated with the migrated property or data object.

Likewise, the documents/files records 422 may correspond to the documents/files records 408, the directory structures records 424 may correspond to the directory structures records 410, any communication records 426 may correspond to the communication records 412.

Regarding the directory structures 410 as maintained on-premises at the customer site and the directory structures 424 as maintained by the remote hosted services, these two structures may be integrated or synchronized to compile a unified or collective list of users, defined across both the customer site and the remote hosted services. This collective list of users may be associated with a particular customer, and/or a particular organization within the customer. In addition, the coexistence tools may select a subset of these users as synchronized from the on-premises customer environment, and activate them to access the hosted services. In these cases, the coexistence tools may assign appropriate licenses to the activated subset of synchronized users.

Continuing the previous example, assume that a given user 414n accesses the hosted service components 106 to change a contacts list record 418 associated with this user. Because the contact list record 418 is associated with the contact list record 406 maintained by the on-premises components 104, any changes made by the user to the record 418 will be synchronized with the record 406. In this manner, the hosted service components 106 and the on-premises components 104 as described herein may enable the contact list records 406 and 418 to coexist, even though the record 406 may reside on-premises at the customer facility, and the record 418 may reside with the hosted service.

Having described the synchronization scenarios shown in FIG. 4, the discussion now precedes to a description of illustrative process and data flows associated with the coexistence tools described herein. This description is now presented with FIG. 5.

Figure 5:
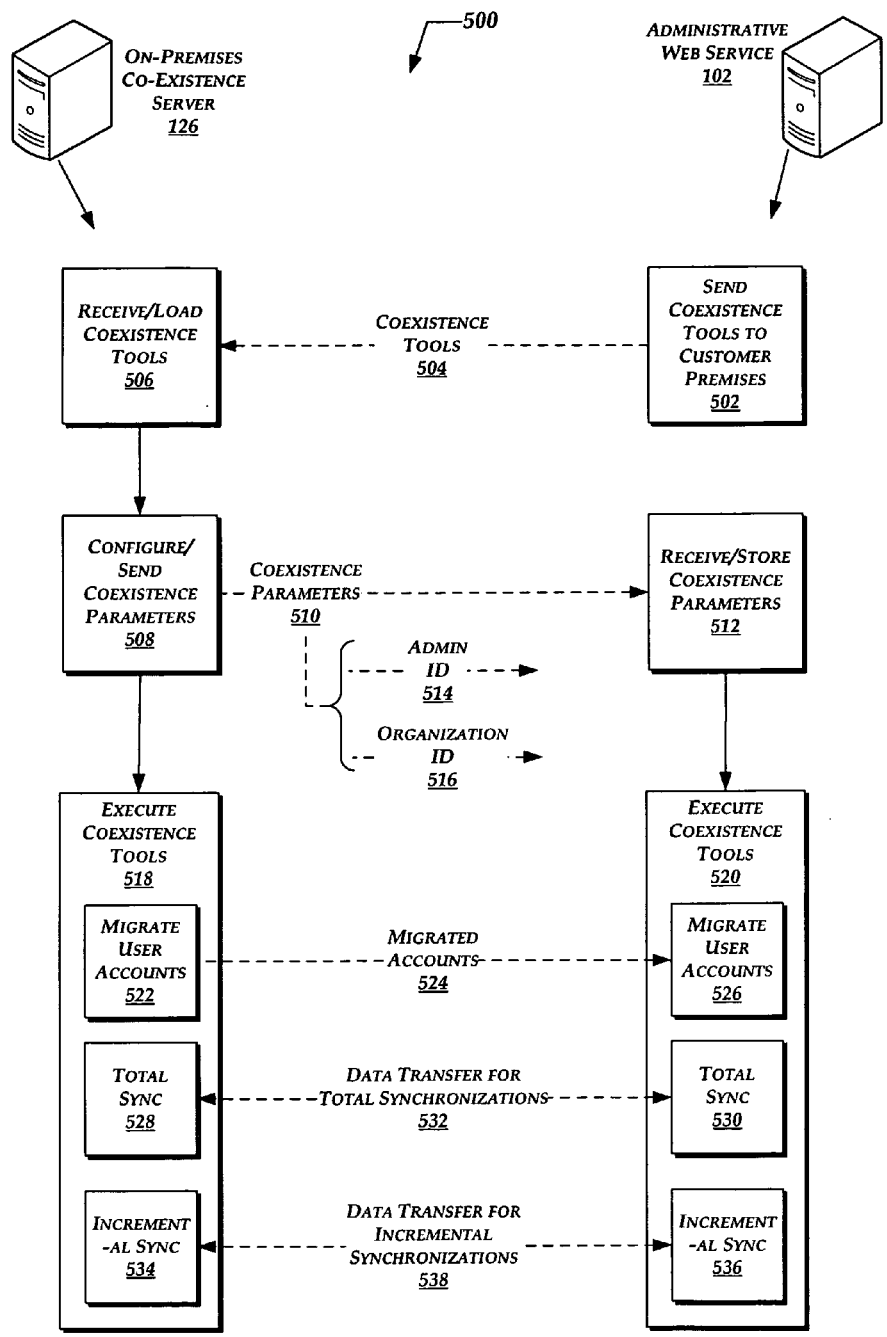
FIG. 5 is a combined process and data flow diagram illustrating processes that the coexistence tools described herein may perform on the customer premises and within the hosted services.

FIG. 5 illustrates examples of process and data flows, denoted generally at 500, that the coexistence tools described herein may perform. For ease of reference, and not limitation, FIG. 5 may carry forward some reference numbers from previous drawings to refer to similar items. For example, FIG. 5 carries forward the servers 126 and 102, with the understanding that software components on these servers may perform the processing illustrated in FIG. 5.

Turning to FIG. 5 in detail, block 502 generally represents sending the coexistence tools to one or more customer premises. FIG. 5 denotes at 504 the coexistence tools as sent to the customer premises. Examples of the coexistence tools may include any of the software components or modules described herein, along with any data stores, or the like. Block 502 may also include sending installation scripts or wizards to the various customer premises.

To provide customers with an appliance-like experience, block 502 may include bundling with the coexistence tools any software on which the coexistence tools may depend. Put differently, if the coexistence tools are built upon other software, this other software may be bundled and installed together with the coexistence tools. In this manner, customer personnel may be relieved from identifying such other software, and downloading it separately.

The term "appliance-like" refers to a system that may be configured and operated with minimal user configuration and interaction. The systems described herein may thus reduce the complexity and skill level involved with installing and running coexistence tools. More specifically, the level of skill or training involved with operating the tools described herein may be somewhat lower than the level of skill or training involved with operating previous coexistence tools.

The appliance concept may also refer to techniques for handling errors. For example, assume that some error occurs on-premises at a customer site, and further assume that this error involves a property that is being managed under the coexistence tools described herein. In this scenario, reports relating to this error may be sent to the "cloud" (i.e., the hosted services components as described herein), rather than to the administrators at the customer site. In this manner, error handling and resolution may be routed to more highly skilled personnel, thereby relieving administrative personnel at the customer site of these duties.

Block 502 may run automatically once a given customer subscribes to the hosted business services. In other instances, block 502 may run in response to a request from a given customer to download the tools and begin operating under the hosted business services.

At the customer premises, block 506 represents receiving the coexistence tools as sent from the hosted business services, and represents running any appropriate installation scripts or wizards to install or load the coexistence tools at the customer premises. As described above with block 502, to provide an appliance-like experience for the customer, block 506 may include executing a single installation script or wizard to install not only the coexistence tools 504, but also any other software on which the coexistence tools may depend.

Having installed and loaded the coexistence tools, block 508 represents configuring the tools for operation with the particular properties installed at a given customer premises. For example, block 508 may include enabling administrators at customer promises (e.g., 308 in FIG. 3) to interact with admin portals (e.g., 316) provided by the coexistence tools.

Block 508 may include responding to input from such administrators to send various parameters 510 specifying how the coexistence tools are to operate on the customer premises. Examples of such parameters may specify when the property is located at the customer premises are to be synchronized with corresponding properties maintained by the hosted business services (e.g., every 24 hours). Other examples of such parameters may identify which properties are to be migrated from the customer process to the hosted business services and synchronized. These examples may include, but are not limited to, synchronization times, synchronization frequency, synchronization scope (e.g., which containers, subsets, or the like are to be synchronized), specific exclusions on synchronization (e.g., do not sync objects with a "-" in the name), rules regarding overwriting data touring synchronization (i.e., edit precedence), rules regarding handing conflict management for data, rules for error handling and notification, and the like At the hosted business services, block 512 represents receiving and storing the specified coexistence parameters, and associating different coexistence parameters with the administrators who specified them. In this manner, the tools described herein may enable different administrators to specify particular coexistence parameters to apply within their specific areas of responsibility. FIG. 5 denotes an example admin ID at 514.

In addition, block 512 may include storing information that identifies the particular customer or organization that has specified particular parameters. FIG. 5 denotes an example organization ID at 516. As illustrated further in connection with FIG. 6, the coexistence tools provided by the hosted business services may operate with a plurality of different organizations, and the organization ID may facilitate tracking and maintaining migration and synchronization data associated with these different organizations.

This description provides the above examples of coexistence parameters 510 for ease of discussion only. However, these examples do not exclude implementations that may include other examples of coexistence parameters.

Having installed the coexistence tools on a given customer premises, and having configured them with the hosted business services, the tools as installed at the customer premises and the hosted business services may now begin operation. FIG. 5 generally represents at 518 ongoing operations at the customer premises, and generally represents at 520 operation at the hosted business services.

As indicated in FIG. 5, block 518 at the customer site may include migrating any identified user accounts or properties to the Web service, as represented generally at block 522. More specifically, block 522 may include migrating properties in response to configuration parameters issued in block 508. For example, as described above, admins who are responsible for particular properties at a customer premises may specify which properties are to be migrated to the hosted business services. FIG. 5 denotes at 524 the migrated accounts or properties.

At the hosted business services, block 526 represents receiving the migrated properties or user accounts 524. Block 526 may include allocating any data storage and building any data structures as appropriate to host the migrated properties.

Having migrated the particular properties as specified between the customer premises and the hosted business service, changes made to those properties at the customer premises and the hosted business services may now be synchronized or reconciled. As described above, different users may access properties either directly through the customer premises, or by accessing the hosted business service. As these changes occur over time, the coexistence tools described herein may synchronize these changes, is so that the properties as maintained at the customer premises are consistent with those properties as maintained by the hosted business services.

As shown in FIG. 5, the coexistence tools may perform a total synchronization between the customer premises and the hosted business services. FIG. 5 generally represents operations related to total synchronizations at 528 (on the customer side) and at 530 (on the hosted business services). FIG. 5 also generally represents at 532 data transfers related to total synchronizations.

As also shown in FIG. 5, the coexistence tools may perform incremental or "delta" synchronizations between the customer premises and the hosted business services. FIG. 5 generally represents operations related to incremental synchronizations at 534 (on the customer side) and at 536 (on the hosted business services). FIG. 5 also generally represents at 538 the data transfers related to incremental synchronizations. Based on these data flows 538, the code systems tools may calculate any properties or data objects appropriate for maintaining a common user list across the on-premises site in the hosted services, as well as for maintaining a unified e-mail address list.

The term "total synchronization", as used herein, refers to a complete transfer of data representing migrated properties between the customer premises and the hosted business service, regardless of any changes that may have occurred in those properties. The term "incremental synchronization", as used herein, refers to a partial transfer of data representing migrated properties between the customer premises and the hosted business service. More specifically, incremental synchronizations may involve the transfers of only changed data between the customer premises and the hosted business services. In this manner, the customer premises and the hosted business services may reconcile changes, while exchanging less information as compared to a total synchronization.

Having described the above examples of processes and data flows in FIG. 5, the discussion now turns to a description of scenarios in which the hosted business services may support a plurality of different customer premises and related organizations. This description is now presented with FIG. 6.

Figure 6:
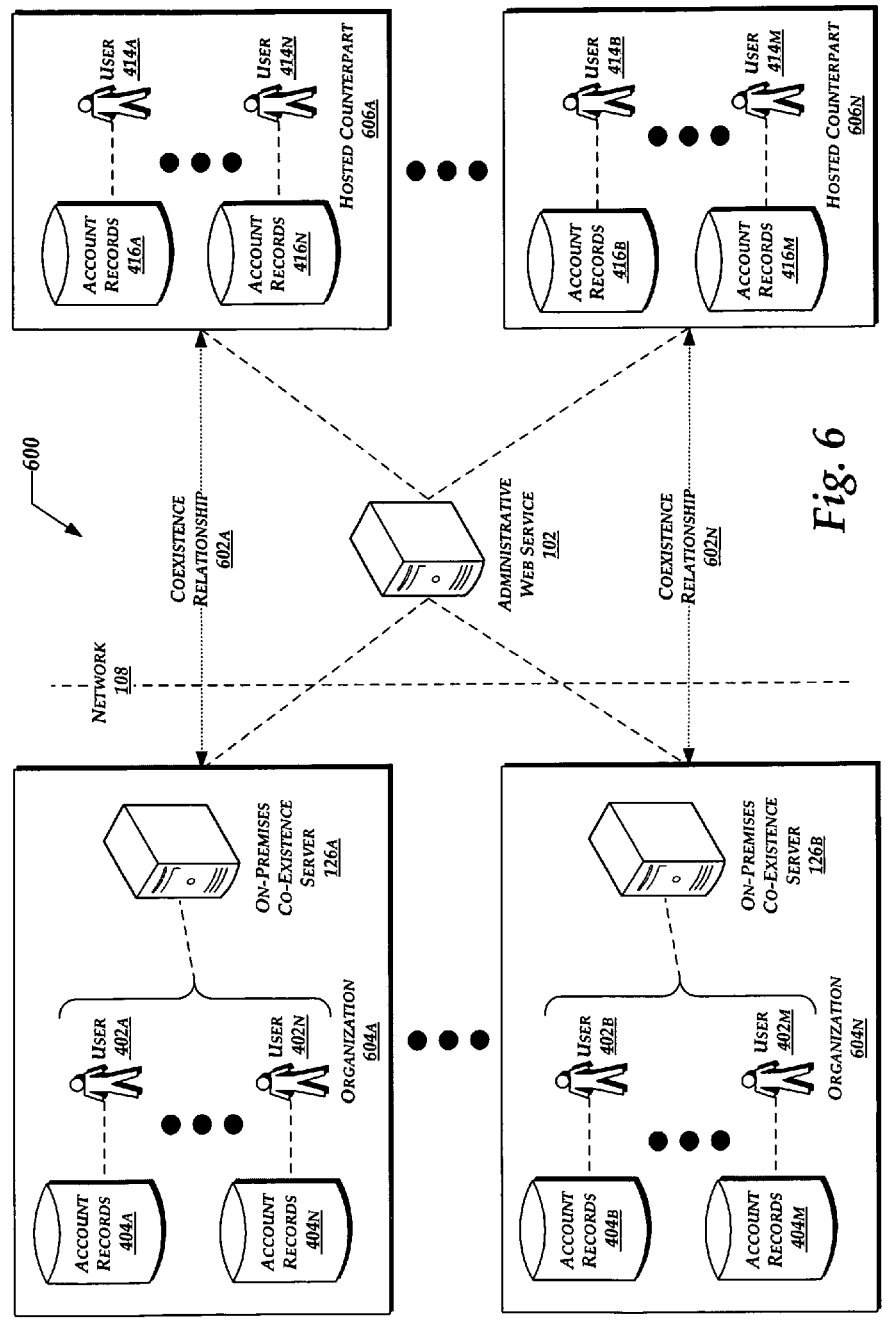
FIG. 6 is a block diagram illustrating scenarios in which hosted business services may coexist with different customer infrastructures at different customer premises.

FIG. 6 illustrates scenarios, denoted generally at 600, in which hosted business services may coexist with different customer infrastructures, existing at different customer premises. For ease of reference, and not limitation, FIG. 6 may carry forward some reference numbers from previous drawings to refer to similar items. For example, FIG. 6 carries forward the administrative server 102 to represent processing performed in connection with the hosted business services.

As shown in FIG. 6, the hosted business services may establish and maintain a plurality of coexistence relationships with a variety of different customer organizations in different customer premises. FIG. 6 provides examples of these coexistence relationships at 602a and 602n (collectively, coexistence relationships 602). These coexistence relationships 602 may generally represent the different types of relationships shown in FIG. 2 (e.g., at 204, 208, and/or 212).

The coexistence relationships 602a may exist between infrastructure maintained at premises associated with a first customer, represented generally by the server 126a. These customer premises may support one or more customer organizations, denoted generally at 604a. Within these customer organizations, a plurality of users may be associated with a corresponding plurality of account records or other properties. FIG. 6 carries forward examples of users within this organization 604a at 402a and 402n, and carries forward examples of corresponding account records at 404a and 404n.

The hosted business services may establish and maintain a hosted counterpart of the customer organization 604a, denoted generally at 606a. This hosted counterpart of the customer organization may include representations of account records or other properties associated with the different users within the customer organization. For ease of description, FIG. 6 carries forward examples of the hosted account records at 416a and 416n, and carries for examples of users at 414a and 414n.

FIG. 6 also illustrates another coexistence relationship 602n, established between a customer premises (represented generally by the server 126b) and a hosted counterpart 606n. At the customer premises, one or more organizations 604n may include any number of users, with FIG. 6 carrying forward examples of users at 402b and 402m. FIG. 6 also carries for examples of account records or other properties associated with these users, as denoted at 404b and 404m.

Turning to the hosted counterpart 606n, maintained by the hosted services for the customer premises represented by the server 126b, FIG. 6 carries forward examples of users, as denoted at 414b and 414m. FIG. 6 also carries forward examples of account records associated with these users, as denoted at 416b and 416m.

As at least part of the coexistence relationships 602, the hosted business services may synchronize or reconcile changes that may occur either on the customer premises or on the hosted counterpart to those customer premises. As a first example, as these changes occur on infrastructure maintained by the hosted business services, the hosted business services may associate customer identifiers, administrative identifiers, and/or organization identifiers with these changes. FIG. 5 illustrates examples of an administrative ID 514 and an organization ID 516. Using these identifiers, the hosted business services may identify the appropriate on-premises customer to receive notifications of these changes, and may synchronize these changes with the appropriate customer.

As another example of processing performed as part of the coexistence relationships 602, as changes occur on customer premises infrastructure, the on-premises coexistence servers 126 may associate these changes with appropriate identifiers (e.g., customer identifiers, admin identifiers, organization identifiers, or the like). The coexistence servers 146 may also reconcile these changes with the hosted business services, using the appropriate identifiers. In turn, the hosted business services may update the appropriate account records, which the hosted business services maintain within the hosted counterparts (e.g., 606) of the customers' on-premises infrastructure.

For convenience of description, the foregoing tools and techniques are described in the context of corporate or enterprise applications. However, it is noted that at least some of the foregoing tools and techniques may be applied in consumer applications as well.

While the preceding description provides various tools and techniques for achieving coexistence between on-premises customer data centers and remote hosted services, these tools and techniques may also provide connectors to additional remote services. In an example scenario, a given client may subscribe to an e-mail protection service offered by a remote services provider, for example to protect some number of enterprise mailboxes from spam, viruses, or like. In addition to these services, however, the remote services provider may also provide the customer with a fail-over capability or continuity service that protects an e-mail server that is on-premises at the customer site. In this scenario, if the customer's on-premises e-mail server fails, then this e-mail server may fail over to the remote services provider. Because the remote services provider is already providing the e-mail protection service to some set of mailboxes, these services provider can identify those mailboxes that are to fail-over from the customer's site.

Although the subject matter presented herein has been described in language specific to computer structural features, methodological acts, and computer readable media, it is to be understood that the appended claims is not necessarily limited to the specific features, acts, or media described herein. Rather, the specific features, acts and mediums are disclosed as example forms of implementing the claims. In addition, certain data flows and process flows are represented by arrows within the drawing figures. It is noted that the directions of these arrows are provided only for convenience in describing the figures, but not to limit possible implementations. More specifically, the directions of the arrows do not exclude or restrict data or process flows in the opposite direction.

The subject matter described above is provided by way of illustration only and should not be construed as limiting. Various modifications and changes may be made to the subject matter described herein without following the example embodiments and applications illustrated and described, and without departing from the true spirit and scope of the following claims.

What is claimed is:

1. An optical disk, magnetic storage device, or semiconductor computer-readable storage device, having instructions stored therein, wherein the instructions, when executed by a processor, cause the processor to:
receive a coexistence tool at an on-premises device, the coexistence tool being received from a remote host device associated with a hosted service;
communicate at least one configuration parameter to the remote host device, wherein the configuration parameter relates to operation of the coexistence tool and comprises an identifier corresponding to the on-premises device;

execute the coexistence tool in accordance with the configuration parameter;
synchronize, via referencing the identifier, on-premises data maintained by the on-premises device with hosted data maintained by the remote host device, the on-premises data and the hosted data relating to the hosted service;
compile a list identifying a first plurality of users accessing the on-premises data and a second plurality of users accessing a counterpart of the on-premises data that is maintained at the remote host device;
assign, to a selected subset of the users, a license to access the remote host device; and
allow the selected subset of the users to access the remote host device.

2. The optical disk, magnetic storage device, or semiconductor computer-readable storage device of claim 1, wherein the configuration parameter is associated with an administrator.

3. The optical disk, magnetic storage device, or semiconductor computer-readable storage device of claim 2, further comprising computer-executable instructions that, when executed by the computer, cause the computer to store data associating the configuration parameter with the administrator.

4. The optical disk, magnetic storage device, or semiconductor computer-readable storage device of claim 1, further comprising computer executable instructions that, when executed by the computer, cause the computer to send a coexistence tool to be installed at a device located at another customer site.

5. The optical disk, magnetic storage device, or semiconductor computer-readable storage device of claim 1, further comprising computer executable instructions that, when executed by the computer, cause the computer to receive a migration of data from the on-premises device.

6. The optical disk, magnetic storage device, or semiconductor computer-readable storage device of claim 1, wherein synchronizing the hosted data comprises performing a total synchronization, wherein the hosted data is updated based upon the on-premises data.

7. The optical disk, magnetic storage device, or semiconductor computer-readable storage device of claim 1, wherein synchronizing the hosted data comprises performing an incremental synchronization, wherein a portion of the hosted data is updated based upon the on-premises data.

8. The optical disk, magnetic storage device, or semiconductor computer-readable storage device of claim 1, further comprising computer executable instructions that, when executed by the computer, cause the computer to create a counterpart of the on-premises data on the administrative server.

9. The optical disk, magnetic storage device, or semiconductor computer-readable storage device of claim 1, further comprising computer-executable instructions that, when executed by the computer, cause the computer to receive, via an administrator portal exposed by the coexistence tool, the configuration parameter.

10. A method comprising:
receiving a coexistence tool at an on-premises device, the coexistence tool being received from a remote host device associated with a hosted service;
communicating at least one configuration parameter to the remote host device, the configuration parameter relating to operation of the coexistence tool and comprising an identifier corresponding to the on-premises device;
executing the coexistence tool in accordance with the configuration parameter; synchronizing on-premises data maintained by the on-premises device with hosted data maintained by the remote host device, the on-premises data and the hosted data relating to the hosted service, wherein synchronizing comprises referencing the identifier;
compiling a list identifying a first plurality of users accessing the on-premises data and a second plurality of users accessing a counterpart of the on-premises data that is maintained at the remote host device;
assigning, to a selected subset of the users, a license to access the remote host device; and
allowing the selected subset of the users to access the remote host device.

11. The method of claim 10, further comprising receiving, via an administrator portal exposed by the coexistence tool, the configuration parameter.

12. The method of claim 11, wherein the configuration parameter is associated with an administrator, and further comprising associating the configuration parameter with the administrator.

13. The method of claim 10, further comprising sending a coexistence tool to be installed at a device located at another customer site.

14. The method of claim 10, further comprising receiving a migration of data from the on-premises device.

15. The method of claim 10, wherein synchronizing the hosted data comprises performing a total synchronization, wherein the hosted data is updated based upon the on-premises data.

16. The method of claim 10, wherein synchronizing the hosted data comprises performing an incremental synchronization, wherein a portion of the hosted data is updated based upon the on-premises data.

17. The method of claim 10, further comprising creating a counterpart of the on-premises data on the remote host device.

18. A system comprising:
an on-premises server associated with a hosted service, the on-premises server being located at a customer site and comprising
a first processor, and
a first optical disk, magnetic storage device, or semiconductor computer-readable storage device, having instructions stored therein, wherein the instructions when executed by the first processor, cause the on-premises serve to
execute an on-premises coexistence component for managing on-premises data maintained by the on-premises server, the on-premises data corresponding to the hosted service; and
an administrative server associated with the hosted service, the administrative comprising a second processor, and
a second optical disk, magnetic storage device, or semiconductor computer-readable storage device, having instructions stored therein, wherein the instructions when executed by the second processor, cause the administrative server to
execute a hosted side coexistence component for maintaining a counterpart of the on-premises data and for synchronizing the counterpart with the on-premises data, the counterpart corresponding to the hosted service, wherein
execution of the hosted-side coexistence component by the administrative server causes the administrative server to transmit a configuration parameter and data indicating that a change has been made to the counterpart to the on-premises server, the configuration parameter relating to operation of the on-premises coexistence component and comprising an identifier corresponding to the customer site, and wherein execution of the on-premises coexistence component by the on-premises server in accordance with the configuration parameter causes the on-premises server to synchronize, by referencing the identifier, the on-premises data with the counterpart, in response to determining that the change has been made to the counterpart, to identify at least one user accessing the hosted service at the on-premises server, to assign a license to access the administrative server to the at least one user, and to indicate that the at least one user is allowed to access the hosted service at the administrative server.

19. The system of claim 18, wherein the administrative server is operative to use the hosted service to instruct the on-premises server to update the on-premises data to reflect a change made to the counterpart.

20. The system of claim 18, wherein the on-premises server is operative to use the hosted service to instruct the administrative server to update the counterpart to reflect a change made to the on-premises data.

* * * * *